United States Patent Office 3,341,485
Patented Sept. 12, 1967

3,341,485
OXIDIZED ESTERS OF FATTY ACIDS AND POLY-HYDROXYL-CONTAINING POLYMERS
James S. Long, Hattiesburg, Miss., assignor, by mesne assignments, to Union Carbide Corporation, a corporation of New York
No Drawing. Filed Oct. 6, 1964, Ser. No. 401,979
9 Claims. (Cl. 260—18)

This invention relates to protective coating compositions.

The novel compositions of the instant invention have outstanding properties that render them of great interest in the paint and varnish field. These compositions were found to exhibit greater blister resistance, showed less dirt pick-up, and tolerated a high pigment concentration, in addition to other advantages that will be discussed hereinafter.

The novel compositions of this invention are the oxidized products produced by the oxidation, with air, oxygen, or a mixture thereof, of an ester of a polyhydroxyl-containing polymer and the coating compositions produced therefrom. The oxidation of the esterified polymer is carried out by blowing air through the molten mixture at an elevated temperature for a prolonged period of time that may extend to several weeks. The preferred temperature at which blowing is carried out is from about 40° C. to about 70° C. The blowing is continued until the final viscosity of the blown esterified polymer is above about 50,000 centipoise units at 50° C. at 100 percent solids. A final viscosity of from about 60,000 to about 100,000 centipoise units at 50° C. at 100 percent solids is preferred, though in some instances higher values can be obtained. These viscosities compare with initial viscosities of the unblown esters of the polyhydroxyl-containing polymers generally of the order of about 10,000 centipoise units, or less, at 50° C. at 100 percent solids. Low viscosity esters are preferred as the starting materials for the oxidation. The oxidized esters of the polyhydroxyl-containing polymers are designated herein by the term "blown ester polymers."

The polyhydroxyl-containing homopolymers and copolymers of monoepoxy alcohol compounds are known. These monoepoxy alcohols contain at least one alcoholic hydroxyl group and a single vicinal oxirane unit, and are free of ethylenic, acetylenic and benzenoid unsaturation.

Illustrative of the monoepoxy alcohol compounds from which said polyhydroxyl-containing polymers can be produced one can mention:

(a) 4-oxatetracyclo[6.2.1.0$^{2,7}$.0$^{3,5}$]undecan-9-ol

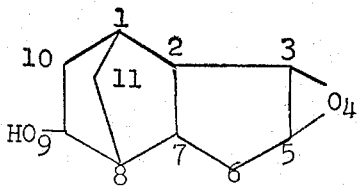

(b) 4-oxatetracyclo[6.2.1.0$^{2,7}$.0$^{3,5}$]undec-9-oxyalkanol

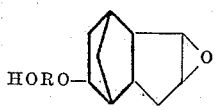

(c) 4-oxatetracyclo[6.2.1.0$^{2,7}$.0$^{3,5}$]undec-9-oxyalkanepolyol

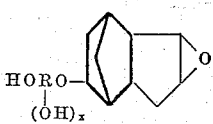

(d) 4-oxatetracyclo[6.2.1.0$^{2,7}$.0$^{3,5}$]undecane-9,10-diol,

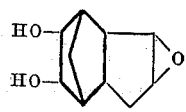

(e) 4-oxatetracyclo[6.2.1.0$^{2,7}$.0$^{3,5}$]undecane-10,11-diol,

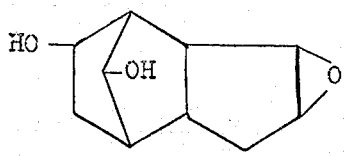

(f) 10-oxapentacyclo[6.3.1.1$^{3,6}$.0$^{2,7}$.0$^{9,11}$]tridecan-4-ol,

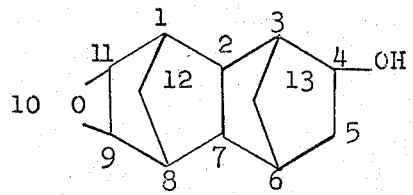

(g) 10-oxapentacyclo[6.3.1.1$^{3,6}$.0$^{2,7}$.0$^{9,11}$]tridecan-4,5-diol,

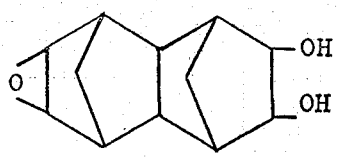

(h) 10-oxapentacyclo[6.3.1.1$^{3,6}$.0$^{2,7}$.0$^{9,11}$]tridec-4-ylalkanol,

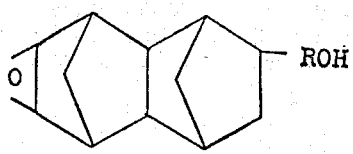

(i) 10-oxapentacyclo[6.3.1.1$^{3,6}$.0$^{2,7}$.0$^{9,11}$]tridec-4,5-ylenedialkanol,

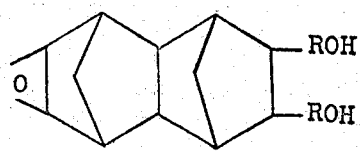

(j) 10-oxapentacyclo[6.3.1.1$^{3,6}$.0$^{2,7}$.0$^{9,11}$]tridec-4-oxyalkanol,

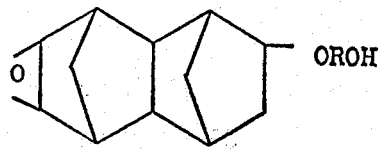

(k) 10-oxapentacyclo[6.3.1.1$^{3,6}$.0$^{2,7}$.0$^{9,11}$]tridec-4-oxyalkanepolyol,

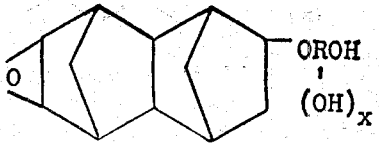

(l) 10 - oxapentacyclo[6.3.1.1³,⁶.0²,⁷.0⁹,¹¹]tridec - 4 - yl-methyleneoxyalkanol,

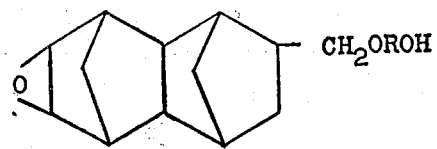

(m) 10 - oxapentacyclo[6.3.1.1³,⁶.0²,⁷.0⁹,¹¹]tridec - 4 - yl-methyleneoxyalkane-polyol,

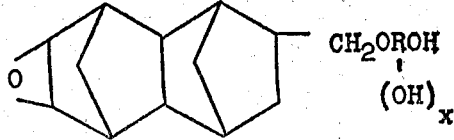

(n) the 4 - oxatetracyclo[6.2.1.0²,⁷.0³,⁵]undec - 9 - oxy-(mono- and polyalkyleneoxy)alkanols, which result from the monoepoxidation of the reaction products of tricyclo[5.2.1.0²,⁶]dec-3-en-8-ol with a saturated aliphatic mono vicinal-epoxyhydrocarbon,

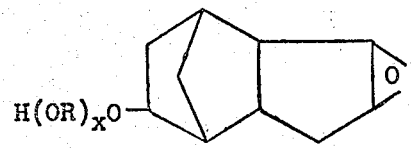

(o) the 4 - oxatetracyclo[6.2.1.0²,⁷.0³,⁵]undec-9,10-ylene-di[oxy(mono- and polyalkyleneoxy)alkanols], which result from the monoepoxidation of the reaction products of tricyclo[5.2.1.0²,⁶]dec-3-ene-8,9-diol with a saturated aliphatic mono vicinal-epoxyhydrocarbon,

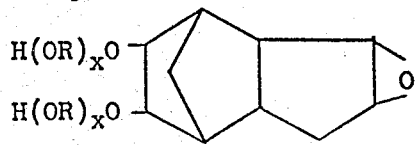

(p) the 4-oxatetracyclo[6.2.1.0²,⁷.0³,⁵]undec-10,11-ylene-di[oxy(mono- and polyalkyleneoxy)alkanols], which result from the monoepoxidation of the reaction products of tricyclo[5.2.1.0²,⁶]dec-3-ene-9,10-diol with a saturated aliphatic mono vicinal-epoxyhydrocarbon,

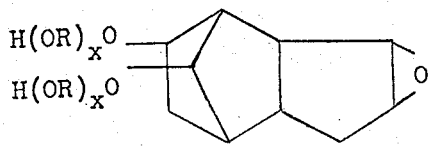

(q) the 10-oxapentacyclo[6.3.1.1³,⁶.0²,⁷.0⁹,¹¹]tridec-4-oxy (mono- and polyalkyleneoxy)alkanols, which result from the monoepoxidation of the reaction products of tetracyclo[6.2.1.1³,⁶.0²,⁷]dodec-9-en-4-ol with a saturated aliphatic mono vicinal-epoxyhydrocarbon,

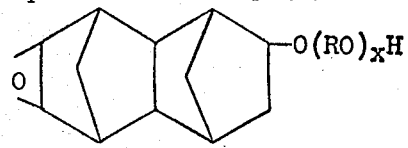

(r) the 10 - oxapentacyclo[6.3.1.1³,⁶.0²,⁷.0⁹,¹¹]tridec-4,5-ylene-di[oxy(mono- and polyalkyleneoxy)alkanols], which result from the monoepoxidation of the reaction products of tetracyclo[6.2.1.1³,⁶.0²,⁷]dodec-9-ene-4,5-diol with a saturated aliphatic mono vicinal-epoxyhydrocarbon,

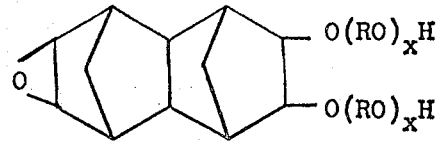

(s) 10-oxapentacyclo[6.3.1.1³,⁶.0²,⁷.0⁹,¹¹]tridec-4-yl-alkyleneoxyalkanol,

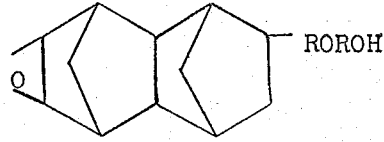

(t) the 10 - oxapentacyclo[6.3.1.1³,⁶.0²,⁷.0⁹,¹¹]tridec-4-yl-alkyleneoxy(mono- and polyalkyleneoxy)alkanols which result from the monoepoxidation of the reaction products of tetracyclo[6.2.1.1³,⁶.0²,⁷]dodec-9-en-4-yl-alkanol with a saturated aliphatic mono vicinal-epoxyhydrocarbon,

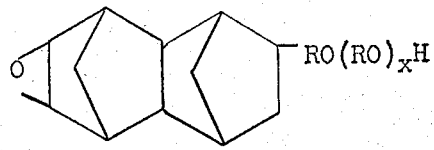

(u) 10-oxapentacyclo[6.3.1.1³,⁶.0²,⁷.0⁹,¹¹]tridec-4,5-ylene-di(alkyleneoxyalkanol), and

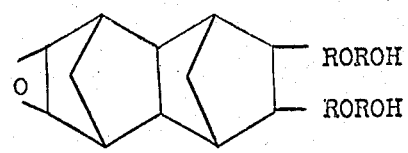

(v) the 10 - oxapentacyclo[6.3.1.1³,⁶.0²,⁷.0⁹,¹¹]tridec-4,5-ylene-di[alkyleneoxy(mono- and polyalkyleneoxy)alkanols] which result from the monoepoxidation of the reaction products of tetracyclo[6.2.1.1³,⁶.0²,⁷]dodec-9-en-4,5-ylene-dialkanol with a saturated aliphatic mono vicinal-epoxyhydrocarbon,

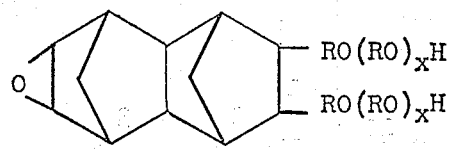

The polymers of the monoepoxy alcohols are polyhydric compositions, which can be illustrated by the following formulas set out for two specific instances:

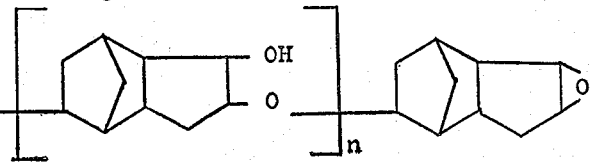

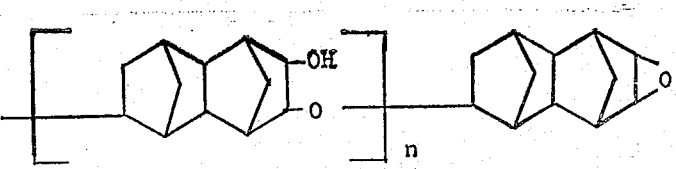

wherein *n* is an integer.

Also known are the copolymers of said monoepoxy alcohols with a vicinal monoepoxide that is free of hydroxyl groups. These copolymers are distinct from the polymers obtained by the polymerization of a compound of the type represented by Class (b) above. The polymers of a Class (b) type compound as produced by the homopolymerization of, for example, 4-oxatetracyclo[6.2.1.0$^{2,7}$.0$^{3,5}$]undec-9-oxyethanol contain as the sole repeating unit the —AB— moiety as follows:

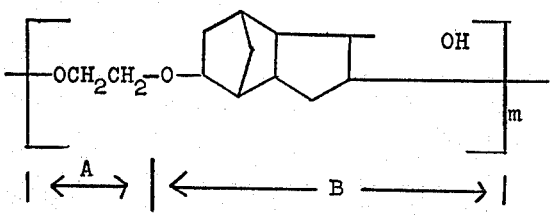

and there is essentially no variation in said structure. The polymers are of the symmetrical structure

—AB—AB—AB—AB—AB— etc. However, the copolymers of the monoepoxy alcohols and a vicinal epoxide are random polymers wherein the groups of each monomer in the copolymer is not uniformly alternating in nature. Thus, the copolymer of ethylene oxide with 4-oxatetracyclo[6.2.1.0$^{2,7}$.0$^{3,5}$]undec-9-oxyethanol consists of two basic moieties, the —AB— moiety and the —C— moiety.

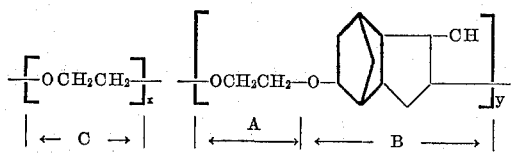

These copolymers can be represented schematically as having the random composition

—C—C—AB—C—C—C—C
—AB—AB—C—AB—AB—AB— etc. When the random copolymer is produced from ethylene oxide and 4-oxatetracyclo[6.2.1.0$^{2,7}$.0$^{3,5}$]undecan-9-ol, the two basic moieties in the molecule are the —B— and —C— moieties:

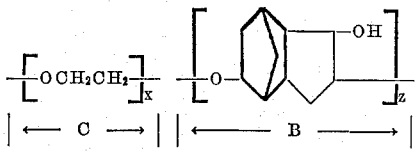

and the random copolymer can be represented schematically as

—C—C—C—B—B—C—B
—B—B—C—C—C—C—B— etc. Thus, it is seen that while all three of the above polymers contain similar chemical units, the polymers are not the same and they differ from each other chemically and structurally.

The vicinal monoepoxides that can be used to produce these copolymers are free of hydroxyl groups and generally consist of carbon, hydrogen and oxygen, with halogen or cyano-nitrogen present in some instances. These compounds can be represented by the formula:

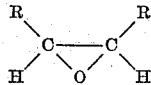

wherein R represents a member selected from the group consisting of hydrogen, alkyl, haloalkyl, aryl, and wherein both Rs when taken together can form a cycloaliphatic group. The cycloaliphatic groups can be unsubstituted or can contain substituents such as nitrile, ester groups, and the like. Preferred compositions are those wherein the sum of the carbon atoms in both R groups is no greater than 12, and preferably no greater than 6. Illustrative R radicals include, among others methyl, ethyl, propyl, butyl, isobutyl, hexyl, isohexyl, 3-propylheptyl, dodecyl, octadecyl, phenyl, benzyl, tolyl, ethylphenyl, butylphenyl, phenylethyl, phenylpropyl, cyclopentyl, cyclohexyl, 2-methylcyclohexyl, cycloheptyl, and the like. It is to be understood, also, that the term "lower 1,2-alkylene oxides" designates that each R variable of the above-depicted structural formula can be satisfied by hydrogen or lower alkyl, e.g., methyl, ethyl, propyl, isobutyl and the like.

Representative vicinal monoepoxide monomers which can be employed include, for example, ethylene oxide, propylene oxide, 1,2-butylene oxide, 2,3-butylene oxide, the epoxypentanes, the epoxyhexanes, 2,3-epoxyheptane, 5-butyl-3,4-epoxyoctane, styrene oxide, ortho-, meta-, and para-ethylstyrene oxide, didecyl 4,5-epoxycyclohexane-1,2-dicarboxylate, 3,4-epoxycyclohexanecarbonitrile, 3,4-dichloro-1,2-epoxybutane, epichlorohydrin, and the like.

The particularly preferred epoxide comonomers which can be polymerized with the aforementioned monoepoxy alcohols include the lower 1,2-alkylene oxides, e.g., ethylene oxide, propylene oxide, 1,2-butylene oxide and 2,3-butylene oxide, and styrene oxide.

As used in this application, the term "polymer" will include all of the homopolymers and copolymers discussed above; as is obvious all of said polymers are also "polyhydroxyl-containing polymers."

The polyhydroxyl-containing polymers are readily esterified with organic monocarboxylic acids. These esters will be designated herein by the term "ester polymers." Among the aliphatic monocarboxylic acids that can be used one includes the saturated and ethylenically unsaturated acids. The mono-, di-, tri- and other ethylenically unsaturated aliphatic monocarboxylic acids are preferred, in particular those in which the unsaturation is conjugated. Illustrative acids include, for instance, butanoic acid, hexanoic acid, caprylic acid, lauric acid, capric acid, myristic acid, oleic acid, linoleic acid, stearic acid, licanic acid, ricinoleic acid, hexenoic acid, hexadienoic acid, octenoic acid. Fatty acids derived from natural sources such as, for example, castor oil, dehydrated castor oil, coconut oil, cottonseed oil, oiticica oil, perilla oil, olive oil, safflower oil, tall oil, sardine oil, soyabean oil, linseed oil, sunflower seed oil, walnut oil, menhaden oil, poppy-seed oil, tung oil, and the like. Mixtures thereof, are advantageous both from an economy standpoint and since highly useful varnishes result from the mixed esterification reaction. If desired, the reaction can be effected in the presence of from about 0.01, and lower, to 5.0 weight percent, and higher, based on the total weight of the reactants, of a known esterification catalyst such as tetraethyltitanate, sulfuric acid, etc., and also, the reaction can be conducted in the presence of an inert normally-liquid organic medium. Suitable media include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substituted-cyclohexane, mineral spirits, and the like; the oxygenated organic compounds, e.g., acetone, methyl ethyl ketone, methyl isobutyl ketone, cyclohexanone, tetrahydrofuran, dioxane, diisopropyl ether, diethyl ether, and the like. The aromatic hydrocarbons are preferred.

The esterification reaction can be conducted at a temperature in the range of from about 100° C., and lower, to about 300° C., and higher, and preferably, from about 200° C. to about 250° C. The reaction period will vary, depending, of course, on factors such as the reaction temperature, the concentrations and reactivities of the reactants selected, the presence or absence of a catalyst, and the like. In general, a reaction period of from 0.5 to about 24 hours is adequate to give a product having an acid value below about 10. The acid value is defined as the milligrams of potassium hydroxide required to neutralize the free acid in one gram of product. Water resulting from the esterification reaction can be removed by methods well known to the art, for example azeotropic distillation. The esterification is preferably carried out under a nitrogen blanket, but this is not critical.

The proportions of the polyhydric polymer and aliphatic monocarboxylic acid which are employed in the esterification reaction are most conveniently expressed in terms of hydroxyl (—OH) groups and carboxyl (—COOH) groups. Highly useful esters are produced by reacting from about 0.1 to 1.0 carboxyl group of the aliphatic monocarboxylic acid per hydroxyl group of the polyhydric polymer, and preferably, from about 0.9 to 1.0 carboxyl group per hydroxyl group; the esters produced from the natural fatty oil acids or fractionally distilled fatty acids derived from natural oils are preferred. It has also been found that up to 10 percent by weight of the fatty acids can be replaced by a modifier such as a dibasic acid or an acid anhydride, for example maleic anhydride, phthallic anhydride, hexahydrophthallic acid, adipic acid, oleic acid dimer, isophthallic anhydride, fumaric acid, maleic acid, etc., or a mono- or polyisocyanate, either aliphatic or aryl, such as octadecylmonoisocyanate, tolylene diisocyanate, methylenediisocyanate, polymethylene polyphenyl isocyanate etc., to improve among others, the color resisting properties on aging.

As previously indicated the blown ester polymers are produced by oxidation of the ester polymers. It is desirable to start the blowing process with an ester polymer of low viscosity in order that a high degree of oxidation can be achieved before the reaction mixture becomes too viscous for the air bubbles to traverse through it under modest pressure. All of the chemical reactions that take place during the blowing are not fully known but it is known that oxidation of the double bonds and an increase in the number of polar groups occurs. That the ester polymers used herein could be blown to yield a useful product was, however, entirely unexpected and unobvious. Coatings of the blown ester polymers on substrates showed increased elongation values while retaining satisfactory tensile strengths, greater adhesion to the substrate, lower water absorbency, slightly improved water permeability, toughness and flexibility, excellent color stability and retention of gloss upon exposure to light and weathering, and in many instances excellent blister resistance properties.

The blown ester polymers are useful per se as varnishes or coating compositions. It is generally desirable however to add from about 0.001 to about 5 weight percent, or more, of a metallic drier. Preferred are the soluble metallic driers such as the naphthenates, linoleates, octoates, etc. of cobalt, lead, zirconium, manganese, etc. in quantities corresponding to 0.001 to 0.1 percent of metallic cobalt, 0.05 to 1 percent of metallic lead, and 0.1 to 1 percent of metallic zirconium or metallic manganese. These are but a few of the many driers known to those skilled in the art.

The blown ester polymers can and in most cases will also be formulated with pigments (hiding pigments and/or structural or inert pigments) and other additives by conventional procedures to produce paint compositions useful for coating wood, paper, metal, plastic, mineral, etc. surfaces. The specific properties that a paint composition exhibits will vary depending upon the particular formulation used; however, in general the paints produced with the blown ester polymers of this invention have overall satisfactory properties.

The following examples further serve to illustrate this invention, They are not, however, to be construed as limiting the invention thereto. Parts are by weight unless otherwise indicated.

*Example 1*

To a reaction vessel there were added 100 parts of a polymer of 4-oxatetracyclo[6.2.1.0$^{2,7}$.0$^{3,5}$]undecan-9-ol having a viscosity at 25° C. of 250 to 350 centipoises as determined on a 50 percent solution in dimethylformamide, 156 parts of tall oil fatty acids and 8.3 parts of xylene. The mixture was heated under nitrogen at about 235° C. at a vigorous reflux for about eight hours while vigorously stirring. The ester polymer produced had an acid number of 8.98 and a Brookfield viscosity of 7500 centipoises at 50° C.

In a similar manner a series of ester polymers was produced at 240° C. to 260° C. The details of the experiments are set forth in Table I for the ester polymers produced from polymers of 4-oxatetracyclo[6.2.1.0$^{2,7}$.0$^{3,5}$]undecan-9-ol with tall oil fatty acids and mixtures of tall oil fatty acids with tung oil fatty acids. Ester polymers are also produced in a similar manner from the polymer of 4-oxatetracyclo[6.2.1.0$^{2,7}$.0$^{3,5}$]undec-9-oxyethanol with soyabean oil fatty acids; the polymer of 4-oxatetracyclo[6.2.1.0$^{2,7}$.0$^{3,5}$]undecan-9,10-diol with linseed oil fatty acids; the polymer of 10-oxapentacyclo[6.3.1.1$^{3,6}$.0$^{2,7}$.0$^{9,11}$]tridec-4-ylmethanol with tall oil fatty acids; the polymer of 10-oxatentacyclo[6.3.1.1$^{3,6}$.0$^{2,7}$.0$^{9,11}$]tridecan-4-5-diol with a mixture of tung oil fatty acids and linseed oil fatty acids; etc.

TABLE I.—ESTER POLYMERS

| Ex. | Polymer | | Tall, Oil parts | Xylene, parts | Ester Polymer | |
|---|---|---|---|---|---|---|
| | Type | Parts | | | Acid number | Brookfield Viscosity Cps. |
| 1 | A | 100 | 156 | 8.3 | 8.98 | |
| 2[1] | A | 100 | 125.1 | 8.3 | 6.77 | |
| 3 | A | 200 | 312 | 16.6 | 9.0 | |
| 4 | B | 200 | 320 | 16.5 | 8.1 | |
| 5 | A | [4]400 | 624 | 33 | 6.7 | |
| 6 | A | 400 | 624 | 33 | 5.6 | |
| 7 | A | 400 | 624 | 33 | 5.9 | |
| 8 | B | 600 | 1158 | 48 | 8.8 | |
| 9 | A | 400 | 624 | 33 | 6.2 | |
| 10[2] | B | 600 | 984 | 48 | 7.1 | |
| 11[2] | A | 718 | 1008 | 54 | 4.5 | |
| 12 | B | 362 | 700 | 32 | 7.2 | |
| 13[3] | A | 400 | 686 | 43 | 7.2 | 3,300 |
| 14[3] | B | 319 | 560 | 27 | 7.3 | 4,900 |
| 15 | B | 362 | 700 | 32 | 7.0 | |
| 16 | B | 319 | 560 | 27 | 5.8 | |
| 17 | B | 319 | 560 | 27 | 6.2 | |

[1] Modified with 2.68 parts of maleic anhydride in the feed charge.
[2] Example 10 was esterified with a mixture of 984 pts. tall oil and 174 pts. tung oil. Example 11 was esterified with a mixture of 1,008 pts. tall oil and 112 pts. tung oil.
[3] Ration of polymer to fatty acid equivalents was 1:1.
[4] 12.7 parts polymer added during the esterification.

A—Polymer of 4-oxatetracyclo[6.2.1$^{2,7}$.0$^{3,5}$]undecan-9-ol having a viscosity of 250 to 350 centipoises in a 50 weight percent solution at 25° C.
B—Polymer of 4-oxatetracyclo[6.2.1$^{2,7}$.0$^{3,5}$]undecan-9-ol having a viscosity of 175 to 250 centipoises in a 50 weight percent solution at 25° C.

*Example 18*

The ester polymer of a random copolymer is produced by adding to a reaction vessel contained in a bath of 75 grams of 4-oxatetracyclo[6.2.1.0$^{2,7}$.0$^{3,5}$]undecan-9-ol, 25 grams of propylene oxide and 46 grams of dioxane. The resulting mixture is cooled to 25° C., and a solution of 2.5 gram of boron trifluoride-etherate in 20 grams of dioxane is added dropwise. The mixture is allowed to warm to 47° C. over a period of 3 hours by controlling the temperature of the bath and a viscous polymeric solution is obtained. Thereafter 51 grams of dioxane are slowly added and the admixture maintained overnight at 40–50° C. At the end of 29 hours an additional 100 grams of dioxane are added. After precipitating in water, there is recovered a solid random coplymeric product. To 50 grams of the solid polymeric product, there is added 75 grams of linseed oil fatty acid and 50 grams of xylene and the mixture is esterified at between about 240° and 260° C. for 6 hours; during this period of time the excess solvent and all of the water are removed and the ester polymer is hard, clear, and tough. This is oxidized to the blown ester polymer by blowing with air for about 20 hours at about 50° C.

Example 19

To a reaction vessel contained in a bath, there are added 82 grams of 4-oxatetracyclo[6.2.1.0$^{2,7}$.0$^{3,5}$]undecan-9-ol, 18 grams of butylene oxide (mixed 1,2- and 2,3- isomers) and 33 grams of dioxane. The resulting mixture is cooled to 17° C., and a solution of 2.5 grams of boron trifluoride-etherate in 19 grams of dioxane is added dropwise. The mixture is allowed to warm to room temperature and thereafter to 32° C. over a period of 27 hours by controlling the temperature of the bath containing the reaction vessel. During this period there are added an additional 35 grams of dioxane. At the end of the period a solid polymeric product is precipitated by the addition of water, and it is filtered and dried overnight in an oven at 70° C. There are obtained 97 grams of the random copolymer having a melting point of 135–145° C. and 8.35 weight percent hydroxyl groups. To 50 grams of this solid polymeric product dissolved in 50 grams of tetrahydrofuran there is added 75 grams of linseed oil acids and 50 grams of xylene, and the mixture is esterified by heating to between about 240° and 260° C. for 6 hours; during this period of time the excess solvent and water are removed. The ester polymer recovered is oxidized to the blown ester polymer by blowing with air for about 20 hours.

Example 20

To a 500 milliliter resin reaction flask equipped with a thermometer and contained in a water bath there are added 213 grams of dichloroethyl ether and the contents of the flask is then cooled to 20° C. A solution of 20 grams of dichloroethyl ether containing 2.5 percent by weight of boron trifluoride-etherate, and a separate mixtures of 85 grams of 4-oxatetracyclo[6.2.1.0$^{2,7}$.0$^{3,5}$]undecan-19-ol and 15 grams of butylene oxide are both added dropwise to the flask over a period of approximately three hours. The reaction mixture is maintained at a temperature of from 19°–23° C. over this period by controlling the temperature of the bath. At the end of the period there is obtained 78 grams of a solid polymeric polyol product which is washed twice in acetone, filtered, and dried in an oven 2–3 hours at 70° C. The product obtained represented 78 percent of the theoretical value. A castor oil fatty acids ester polymer is produced by heating at 185° C. enough dehydrated castor oil fatty acids to esterify 64 percent of the hydroxyl groups of the polyol polymer; 0.1 percent octylene glycol titanate based on the weight of the reactants is used as an esterification catalyst. Xylene, 30–35 percent based on the weight of the reactants, is used to aid solution and to aid in the removal of water. The heating is continued for 5–6 hours or until the acid number is below 4.0. The ester polymer is blown with air for about 50 hours, to produce the blown ester polymer.

Example 21

About one liter of the ester polymer of Example 4 was placed in a bell jar. Air was blown through the composition while the temperature was maintained at about 50° C. After 39 hours of blowing the blown ester polymer had a viscosity of 40,000 centipoise units at 50° C. at 100 percent solids. After 56 hours of blowing the viscosity was 60,000 centipoises. Films were cast from 50 percent xylene solutions and their properties determined. The properties of these films are tabulated in Table II. Also reported in Table II are the results obtained for a series of examples of blown ester polymers produced in a similar manner wherein blowing was carried out at about 45 to 55° C. for from 60 to 100 hours. In this table comparative data is also given, whenever available, of the properties of films (control) produced from the ester polymers before they had undergone the blowing treatment. The Brookfield viscosities were determined at 50° C. In some instances some pure xylene was added to the reaction mixture during the oxidation to obtain a more fluid mixture.

TABLE II.—BLOWN ESTER POLYMERS

| Example | Ester Polymer Charged Source | Blown Ester Polymer Properties | | |
|---|---|---|---|---|
| | | Brookfield Viscosity, cps. | Tensile strength, p.s.i. | Elongation, percent |
| 21 Control | Ex. 4 | 70,000 | 385 | 39 |
| | | | 496 | 76 |
| 22 | Ex. 5 | (*) | 380 | 23.8 |
| 23 | Ex. 6 | (*) | 927 | 48.3 |
| 24 | Ex. 7 | (*) | 1,350 | 5 |
| 25 | Ex. 8 | (*) | | |
| 26 | Ex. 9 | (*) | | |
| 27 | Ex. 10 | (*) | | |
| 28 | Ex. 11 | (*) | | |
| 29 | Ex. 12 | 67,000 | 940 | 48 |
| 30 Control | Ex. 14 | 34,500 | 1,370 | 38 |
| | | 3,300 | | |
| 31 Control | Ex. 15 | 57,000 | 479 | 55.5 |
| | | 4,900 | | |
| 32 | Ex. 16 | 63,000 | 1,171 | 26.6 |
| 33 | Ex. 17 | 69,000 | | |

*Very viscous product recovered, viscosity not determined.

Paint and varnish compositions were produced using the ester polymer or the blown ester polymer as the paint vehicle. The paints were produced by conventional procedures known in the art, using the conventional pigments, thinners, driers, mildewicides, inerts, etc. The formulation of a paint is well known to those skilled in the art and the use of the novel paint vehicles of this invention in the formulation of paints poses no problem to the skilled formulator; particularly in view of the instant teachings. The particular pigment, whether white or colored, is not critical; however, as is known, in some formulations one pigment may be preferred in place of another as it may exhibit enhanced properties in the paint. Thus, for example, zinc oxide was observed to lower the blister resistance and its presence should consequently be avoided where blister resistance is important. This is also known to be true for the other ingredients used in preparing a paint formulation. It was noted that in most instances the paints and varnishes of this invention had less odor than conventional oil paints.

A varnish was produced containing 50 weight percent solids by diluting the ester polymer of Example 1 with xylene. The varnish contained 0.01 percent metallic cobalt as the naphthenate and 0.5 percent metallic lead also as the naphthenate as drier. In some cases 0.4 percent metallic zirconium was also used. Films were produced by coating on a surface and the "set to touch," "cotton free" and "paper free" drying times were determined; i.e., the time when the varnish no longer sticks to the finger, cotton or paper. Also determined were Sward hardness, tensile strength and percent elongation. These values were also obtained on two other varnishes prepared from ester polymers produced in a manner similar to that set forth in Example 1. The results for Varnishes 1, 2 and 3 are set forth below together with the results for Varnish 4 produced in a similar manner with the ester polymer of Example 2. These values are presented for comparative purposes with the properties of varnishes and paints produced using the blown ester polymers of this invention as the paint vehicle. A film coating of the polymer used to produce the ester polymer of Example 1 was brittle.

| | Varnish No. | | | |
|---|---|---|---|---|
| | 1 | 2 | 3 | 4 |
| Drying time, min.: | | | | |
| Set to touch | 20 | 15 | 25 | 15 |
| Cotton free | 80 | 40 | 80 | 45 |
| Paper free | 180 | 120 | >180 | >180 |
| Sward hardness: | | | | |
| 7 days | 13 | 20.5 | 14 | 24 |
| 14 days | 17.5 | 23.5 | 17.5 | 28 |
| Tensile strength, p.s.i. | 1,430 | 2,430 | 1,200 | 2,550 |
| Elongation, percent | 56 | 27 | 67 | 6.2 |

Paints were prepared by grinding the components in a pebble mill to a fineness of 7 Hegman or higher. The paint vehicle used in each formulation was the blown ester polymer of this invention designated in Table III. For comparative purposes a paint was also prepared using the unblown ester polymer; this control sample is identified as 34A in Table III. Example 53A is a paint produced using a conventional blown alkyd resin as the vehicle. The formulations, and the properties of the paints, are set forth in Table III. These paints contained metallic driers having from 0.01 to 0.1 percent metallic cobalt, and from 0.1 to 1 percent metallic zirconium, lead, zinc or magnesium in varying concentrations and combinations, as known in the art.

VEHICLE 58%

| Vehicle: | Percent |
|---|---|
| Alkyd resin | 57.0 |
| Petroleum thinner | 42.1 |
| Driers | 0.9 |
| | 100.0 |

Paint II is a commercially available outside white gloss paint having the following composition:

TABLE III.—PAINT COMPOSITIONS

| | Example | | | | | | | | | | | |
|---|---|---|---|---|---|---|---|---|---|---|---|---|
| | 34 | 34A | 35 | 36 | 37 | 38 | 39 | 40 | 41 | 42 | 43 | 44 |
| Paint vehicle:[1] | | | | | | | | | | | | |
| Blown ester polymer | 22/84 | | 22/84 | 23/84 | 23/84 | 23/84 | 23/84 | 24/87 | 24/101 | 25/123.3 | 26/123.3 | 25/123.3 |
| Unblown ester polymer | | 5/84 | | | | | | | | | | |
| Blown alkyd pigment, pts.: | | | | | | | | | | | | |
| Zinc oxide | 38.5 | 38.5 | | | | 42.6 | | | | | | 28.6 |
| Titanium dioxide | 29 | 29 | 29 | 23.2 | 26.1 | | | 55 | 55 | 72.2 | 72.2 | 66.7 |
| | | | | | | | | | | | | 49.1 |
| Inert, pts. | | | | | | | | | | | | |
| Asbestine | 60.8 | 60.8 | 80.4 | 54.2 | 36.1 | 80.4 | 80.4 | 179 | 107 | 65.7 | 65.7 | |
| Barium metaborate[2] | | | | | 44.5 | | 34.6 | | 22.1 | | | |
| Thinner, pts.: | | | | | | | | | | | | |
| Xylene | 114 | 114 | 90 | 68 | 85 | 85 | 85 | | | | | |
| Mineral spirits | | | | | | | | 116 | 117 | 68.9 | 68.9 | 68.9 |
| Fineness of grind | 7 | 7 | | | | | | | | | | |
| PVC[3] | 30 | 30 | 30 | 24 | 27 | 30 | 30 | 30 | 30 | 25 | 25 | 25 |
| Tensile strength, p.s.i. | 1,495 | 1,890 | 1,350 | 1,295 | 1,315 | | | 1,400 | 1,552 | | | |
| Elongation, percent | 2.3 | | 7.6 | 6.9 | 5.4 | | | 2.2 | 3.5 | | | |
| Water absorption, percent | 13.3 | 14.9 | 18.2 | 18.8 | 24.2 | | | 4.3 | 13.1 | | | |

| | Example | | | | | | | | | | | |
|---|---|---|---|---|---|---|---|---|---|---|---|---|
| | 45 | 46 | 47 | 48 | 49 | 50 | 51 | 52 | 53 | 53A | 54 | 55 |
| Paint vehicle:[1] | | | | | | | | | | | | |
| Blown ester polymer | 27/123.3 | 28/148 | 26/118.1 | 29/183.5 | 30/198.5 | 21/171 | 31/176 | 31/182 | 32/230 | | 18/171 | 20/176 |
| Unblown ester polymer | | | | | | | | | | 230 | | |
| Blown alkyd pigment, pts.: | | | | | | | | | | | | |
| Zinc oxide | 38.6 | | | | | | | | | | | |
| Titanium dioxide | 66.7 | 86.6 | 78.7 | 77 | 99 | 70.8 | 71.4 | 72 | 91 | 91 | 70.8 | 71.4 |
| | 49.1 | | | | | | | | | | | |
| Inert, pts. | | | | | | | | | | | | |
| Asbestine | | 78.7 | 186.2 | 261 | 152 | 64 | 53.3 | 42.4 | 53.5 | 53.5 | 64 | 53.3 |
| Barium metaborate[2] | | | | | | | | | | | | |
| Thinner, pts.: | | | | | | | | | | | | |
| Xylene | | | | 137 | 98 | 80.4 | 79.5 | 78 | 37.2 | 37.2 | 80.4 | 79.5 |
| Mineral spirits | 68.9 | 82.9 | 82.6 | | | | | | | | | |
| Fineness of grind | | | | | | | | | | | | |
| PVC[3] | 25 | 25 | 43 | 40 | 28 | 20 | 18 | 16 | 16 | 16 | 20 | 18 |
| Tensile strength, p.s.i. | | | | 2,100 | 2,050 | 1,808 | 1,551 | 1,171 | 465 | 214 | | |
| Elongation, percent | | | | 3 | 5 | 18.3 | 22.1 | 26.6 | 31 | 34.5 | | |
| Water absorption, percent | | | | | | | | | | | | |

[1] Source/parts; e.g.: Example 22/84 parts.  [2] Magnesium silicate.  [3] Pigment volume concentration.

Blister properties were determined on several of the paints using the blister box test set forth in the 1958 ASTM manual Part 8, pages 890 to 895. The redwood panels were painted as follows:

Panel A—Primed with Paint I and finished with Paint II
Panel B—Two coats of Example 42
Panel C—Two coats of Example 43
Panel D—Primed with Example 42 and finished with Example 44
Panel E—Primed with Example 43 and finished with Example 45
Panel F—Primed with Paint III and finished with Paint IV.

Paint I is a commercially available primer having the following composition:

PIGMENT 42%

| Pigment: | Percent |
|---|---|
| Titanium dioxide | 27.6 |
| Barium metaborate | 11.1 |
| Silica and silicates | 61.3 |
| | 100.0 |

PIGMENT 40.7%

| Pigment: | Percent |
|---|---|
| Titanium dioxide | 44.9 |
| Barium metaborate | 22.5 |
| Silicates | 32.6 |
| | 100.0 |

VEHICLE 59.3%

| Vehicle: | Percent |
|---|---|
| Soya alkyd | 61.8 |
| Pine oil | 2.3 |
| Petroleum thinner | 35.1 |
| Drier | 0.8 |
| | 100.0 |

Films of Paints, I and II had the following properties:

| | Paint | |
|---|---|---|
| | I | II |
| Tensile strength, p.s.i. | 692 | 614 |
| Elongation, percent | 16.2 | 28.1 |
| Water Absorption, percent | 11.0 | 20.8 |

Paint III is a commercially available white wood undercoat having the following composition:

PIGMENT 38%

| Pigment: | Percent |
|---|---|
| Titanium dioxide | 54.0 |
| Silicates | 46.0 |
| | 100.0 |

VEHICLE 62%

| Vehicle: | Percent |
|---|---|
| Latex* | 70.0 |
| Water | 30.0 |
| | 100.0 |

| *Latex: | Percent |
|---|---|
| Non-volatile | 42.0 |
| Water | 58.0 |
| | 100.0 |

Paint IV is a commercially available white gloss house paint having the following composition:

PIGMENT 61%

| Pigment: | Percent |
|---|---|
| Mono basic leaded zinc oxide* | 40.0 |
| Titanium dioxide | 17.0 |
| Silicates | 43.0 |
| | 100.0 |

VEHICLE 39%

| Vehicle: | Percent |
|---|---|
| Raw linseed oil | 44.0 |
| High polymer oil | 28.0 |
| Drier | 10.0 |
| Mineral spirits | 18.0 |
| | 100.0 |

| *Mono basic leaded zinc oxide: | Percent |
|---|---|
| Zinc oxide | 82.0 |
| Basic lead sulfate | 18.0 |
| | 100.0 |

| Panel | Time, days | Blisters Size [1] | Density [2] |
|---|---|---|---|
| A | 6 | 6 | F |
|   | 13 | 6 | F |
|   | 15 | 7 | F |
|   | 20 | 6 | M |
| B | 6 | 8 | F |
|   | 13 | 8 | F |
|   | 15 | 8 | F |
|   | 20 | 8 | F |
| C | 13 |  | N |
|   | 15 |  | N |
|   | 20 |  | N |
| F | 6 | 8 | F |
|   | 13 | 8 | F |
|   | 15 | 8 | F |
|   | 20 | 8 | M |
| D | 6 |  | N |
|   | 13 |  | N |
|   | 15 | 7 | F |
|   | 20 | 4 | F |
| E | 15 |  | N |
|   | 20 |  | N |

[1] Size No. 4=⅛ inch blister; 6=1/16 inch blister; 8=1/32 inch blister.
[2] N=none; F=few; M=medium.

Corrosion properties were determined by dipping hot-rolled carbon steel rods, ⅝ inch diameter, into the paint and then drying for five days. The dipped rods were immersed in the corrosive medium at ambient temperature and checked every day for corrosion effect.

Paint V was the paint of Example 52.
Paint VI was the paint of Example 53A.
Paint VII was a commercially available paint having the following composition: titanium calcium pigment 30.05%, titanium dioxide 5.11%, zinc oxide 15.02%, silicates 5.71%, processed linseed oil 31.42%, petroleum thinner 10.92%, metallic driers 0.56%, tetrachlorophenol 1.13%, and phenyl mercuric acetate 0.08%; the pigment volume concentration was about 33%. The corrosive mediums used were 30% nitric acid, 30% ammonium hydroxide and a saturated solution of the salts sodium sulfate and ammonium chloride.

| Paint | Time, days | Effect of 30% HNO₃ | Effect of 30% NH₄OH | Effect of salt solution |
|---|---|---|---|---|
| V | 1 | None | Few small bumps | None. |
|   | 2 | do | do | Pale yellow. |
|   | 3 | Few small bumps | Many bumps | Do. |
|   | 6 | White, few small bumps | Peeling | Do. |
|   | 10 | Yellow, many small bumps | Wrinkled and peeling | Do. |
| VI | 1 | Yellow | Many bumps | None. |
|   | 2 | Yellow, few small bumps | Entire surface with bumps | Pale yellow. |
|   | 3 | Yellow, peeling | Peeling | Do. |
|   | 6 | Brown, peeling | Wrinkled and peeling | Deep yellow. |
|   | 10 | do | do | Do. |
| VII | 1 | Brown, wrinkled surface | Wrinkled | Few wrinkles. |
|   | 2 | Brown, peeling | Discolored, heavy peeling | Deep yellow, peeling. |
|   | 6 | do | do | Do. |
|   | 10 | do | do | Do. |

The paints were tested for odor by placing thoroughly dried panels in separate air-tight cans overnight. Paint V had a very faint nearly imperceptible odor; Paint VI had a pungent, unpleasant odor; and Paint VII had the typical linseed oil odor.

Tensile strength and elongation were determined on cured films using the Gardner Tensile Strength and Elongation Apparatus, Model No. TG-1500. Water absorption was the amount of water absorbed by a film immersed in water at room temperature for three days. Viscosity was determined with the Brookfield Viscometer using spindle No. 4; it was measured either at 50° C. (blowing temperature), or at 70° F. with the sample diluted ten weight percent with xylene.

What is claimed is:

1. A film-forming composition comprising the blown oxidized monocarboxylic fatty acid esters of the polyhydroxyl-containing polymers selected from the group of (A) polymers obtained by the polymerization of at least one monoepoxy alcohol selected from the group consisting of:

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkanepolyol,
(d) 4-oxatetracyclo[6.2.1.0$^{2,7}$.0$^{3,5}$]undecan-9,10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol,
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylenedialkanol,
(j) 10-oxapentacyclo[6.3.1.1$^{3,6}$.0$^{2,7}$.0$^{9,11}$]tridec-4-oxyalkanol,
(k) 10-oxapentacyclo[6.3.1.1$^{3,6}$.0$^{2,7}$.0$^{9,11}$]tridec-4-oxyalkanepolyol
(l) the 4-oxatetracyclo[6.2.1.0$^{2,7}$.0$^{3,5}$]undec-9-oxy (polyalkyleneoxy) alkanols, which result from the monoepoxidation of the reaction products of tricyclo[5.2.1.0$^{2,6}$]dec-3-en-8-ol with a saturated aliphatic mono vicinal-epoxyhydrocarbon, (m) the 4-oxatetracyclo[6.2.1.0$^{2,7}$.0$^{3,5}$]undec - 9,10-ylene-di[oxy(mono- and polyalkyleneoxy)alkanols] which result from the monoepoxidation of the reaction products of tricyclo[5.2.1.0$^{2,6}$]dec-3-ene-8,9-diol with a saturated aliphatic mono vicinalepoxyhydrocarbon, (n) the 4-oxatetracyclo[6.2.1.0$^{2,7}$.0$^{3,5}$]undec-10,11-ylene-di[oxy(mono- and polyalkyleneoxy)alkanols] which result from the monoepoxidation of the reaction products of tricyclo[5.2.1.0$^{2,6}$]dec-3-ene-9,10-diol with a saturated aliphatic mono vicinalepoxyhydrocarbon, (o) the 10-oxapentacyclo[6.3.1.1$^{3,6}$.0$^{2,7}$.0$^{9,11}$]tridec - 4-oxy-(polyalkyleneoxy)alkanols which result from the monoepoxidation of the reaction products of tetracyclo[6.2.1.1$^{3,6}$.0$^{2,7}$]dedec-9-en-4-ol with a saturated aliphatic mono vicinalepoxyhydrocarbon, (p) the 10-oxapentacyclo[6.3.1.1$^{3,6}$.0$^{2,7}$.0$^{9,11}$]tridec - 4,5-ylene - di[oxy(mono- and polyalkyleneoxy)alkanols] which result from the monoepoxidation of the reaction products of tetracyclo[6.2.1.1$^{3,6}$.0$^{2,7}$]dodec-9-ene - 4,5-diol with a saturated aliphatic mono vicinalepoxyhydrocarbon, (q) 10-oxapentacyclo[6.3.1.1$^{3,6}$.0$^{2,7}$.0$^{9,11}$]tridec - 4 - ylalkleneoxyalkanols, (r) the 10 - oxapentacyclo[6.3.1.1$^{3,6}$.0$^{2,7}$.0$^{9,11}$]tridec - 4-ylalkyleneoxy(polyalkyleneoxy)alkanols which result from the monoepoxidation of the reaction products of tetracyclo[6.2.1.1$^{3,6}$.0$^{2,7}$]dodec-9-en-4-ylalkanol with a saturated aliphatic mono vicinalepoxyhydrocarbon, (s) 10-oxapentacyclo[6.3.1.1$^{3,6}$.0$^{2,7}$.0$^{9,11}$]tridec-4,5-ylene-di(alkleneoxyalkanol), (t) the 10-oxapentacyclo[6.3.1.1$^{3,6}$.0$^{2,7}$.0$^{9,11}$]tridec - 4,5-ylene-di[alkyleneoxy(polyalkyleneoxy)alkanols] which result from the monoepoxidation of the reaction products of tetracyclo[6.2.1.1$^{3,6}$.0$^{2,7}$]dodec-9-en-4,5 - ylene-dialkanol with a saturated aliphatic mono vicinalepoxyhydrocarbon, and (B) copolymers obtained by the polymerization of at least one of said monoepoxy alcohols with at least one monoepoxide of the formula:

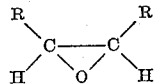

wherein R represents a member selected from the group consisting of hydrogen, alkyl, haloalkyl, aryl, and wherein both R's can form a six-member cycloaliphatic ring, said blown, oxidized monocarboxylic fatty acid esters having a viscosity above about 50,000 centipoise units at 50° C. at 100 percent solids.

2. A film-forming composition comprising the blown oxidized ester of tall oil fatty acids and the polyhydric polymer obtained by the polymerization of 4-oxatetracyclo-[6.2.1.0$^{2,7}$.0$^{3,5}$]undecan-9-ol, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

3. A film-forming composition comprising the blown oxidized ester of soyabean fatty acids and the polyhydric polymer obtained by the polymerization of 4-oxatetracyclo-[6.2.1.0$^{2,7}$.0$^{3,5}$]undecan-9-ol, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

4. A film-forming composition comprising the blown oxidized ester of a mixture of tall oil fatty acids and tung oil fatty acids and the polyhydric polymer obtained by the polymerization of 4-oxatetracyclo[6.2.1.0$^{2,7}$.0$^{3,5}$]undecan-9-ol, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

5. A film-forming composition comprising the blown oxidized ester of linseed oil fatty acids and the polyhydric copolymer obtained by the polymerization of 4-oxatetracyclo[6.2.1.0$^{2,7}$.0$^{3,5}$]undecan-9-ol and propylene oxide, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

6. A film-forming composition comprising the blown oxidized ester of linseed oil fatty acids and the polyhydric copolymer obtained by the polymerization of 4-oxatetracyclo-[6.2.1.0$^{2,7}$.0$^{3,5}$]undecan-9-ol and butylene oxide, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

7. A film-forming composition comprising the blown oxidized ester of linseed oil fatty acids and the polyhydric copolymer obtained by the polymerization of 4-oxatetracyclo-[6.2.1.0$^{2,7}$.0$^{3,5}$]undecan-9-ol and styrene oxide, said oxidized ester having a viscosity above about 50,000 centipoise units at 50° C. at 100 percent solids, and said ester prior to oxidation being the reaction product of from about 0.1 to about 1 carboxyl group of said fatty acids per hydroxyl group of the polyhydric polymer.

8. A film-forming composition comprising the blown oxidized ester of dehydrated castor oil fatty acids and the polyhydric copolymer obtained by the polymerization of 4-oxa-tetracyclo[6.2.1.0$^{2,7}$.0$^{3,5}$]undecan-9-ol and propylene oxide, said oxidized ester having a viscosity above about 50,000 centipoise units at 50° C. at 100 percent solids, and said ester prior to oxidation being the reaction product of about from 0.1 to about 1 carboxyl group of said fatty acids per hydroxyl group of the polyhydric polymer.

9. A film-forming composition as claimed in claim 1 having therein pigment thinner and drier.

References Cited
UNITED STATES PATENTS

| | | | |
|---|---|---|---|
| 2,059,259 | 11/1936 | Long et al. | 260—406 |
| 2,717,882 | 9/1955 | Kiebler et al. | 260—22 |
| 3,247,137 | 4/1966 | McGary et al. | 260—18 |

DONALD E. CZAJA, *Primary Examiner.*

LEON J. BERCOVITZ, *Examiner.*

C. W. IVY, *Assistant Examiner.*